(12) United States Patent  
McNeilus et al.

(10) Patent No.: US 7,963,535 B2  
(45) Date of Patent: Jun. 21, 2011

(54) TAG AXLE PIVOT MOUNT

(75) Inventors: Grant T. McNeilus, Dodge Center, MN (US); Brian R. Meldahl, Brownsdale, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 304 days.

(21) Appl. No.: 12/179,928

(22) Filed: Jul. 25, 2008

(65) Prior Publication Data

US 2010/0019464 A1    Jan. 28, 2010

(51) Int. Cl.  
*B60G 9/02* (2006.01)

(52) U.S. Cl. ............... 280/86.5; 280/124.116; 180/209

(58) Field of Classification Search ............. 280/86.5, 280/124.116; 180/209, 24.02; 403/26  
See application file for complete search history.

(56) References Cited

U.S. PATENT DOCUMENTS

| | | | |
|---|---|---|---|
| 1,993,260 A * | 3/1935 | Burns | ............ 267/281 |
| 4,421,331 A | 12/1983 | Ferris | |
| 4,684,142 A | 8/1987 | Christenson | |
| 4,762,421 A | 8/1988 | Christenson et al. | |
| 4,812,044 A | 3/1989 | Christenson | |
| 4,840,395 A | 6/1989 | Sturmon | |
| 4,848,783 A | 7/1989 | Christenson et al. | |
| 5,018,593 A | 5/1991 | Hermann | |
| 5,018,755 A | 5/1991 | McNeilus et al. | |
| 5,029,895 A | 7/1991 | Anderson | |
| 5,149,126 A | 9/1992 | Brennan | |
| 5,238,262 A | 8/1993 | Nunes | |
| 5,437,145 A | 8/1995 | Farley et al. | |
| 5,498,021 A | 3/1996 | Christenson | |
| 5,540,454 A | 7/1996 | VanDenberg et al. | |
| 5,713,424 A | 2/1998 | Christenson | |
| 5,897,123 A | 4/1999 | Cherney et al. | |
| 6,074,126 A | 6/2000 | Hunter et al. | |
| 6,123,347 A | 9/2000 | Christenson | |
| 6,135,469 A | 10/2000 | Hulstein et al. | |
| 6,189,901 B1 | 2/2001 | Smith et al. | |
| 6,247,713 B1 | 6/2001 | Konop | |
| 6,371,499 B1 | 4/2002 | Konop | |
| 6,416,136 B1 | 7/2002 | Smith | |
| 6,478,317 B2 * | 11/2002 | Konop | ............ 280/86.5 |
| 6,619,639 B1 | 9/2003 | Shelley et al. | |
| 6,666,491 B2 | 12/2003 | Schrafel | |
| 6,758,535 B2 | 7/2004 | Smith | |
| 6,811,292 B2 | 11/2004 | Chistenson | |
| 7,101,075 B2 | 9/2006 | Silbernagel | |
| 7,175,189 B1 * | 2/2007 | Eull | ............ 280/86.5 |
| 7,343,771 B2 * | 3/2008 | Marx | ............ 72/457 |

* cited by examiner

*Primary Examiner* — Paul N. Dickson  
*Assistant Examiner* — Timothy D Wilhelm  
(74) *Attorney, Agent, or Firm* — Haugen Law Firm PLLP; Frederick W. Niebuhr (57) ABSTRACT

An arrangement for pivotally coupling an auxiliary axle frame to a vehicle chassis includes a pair of support brackets, each fastened to one of two opposite longitudinal rails of the chassis. Each bracket is coupled to its associated rail with a set of threaded fasteners extended through aligned openings in the bracket and rail. Each fastener is tightened to a predetermined level of tensile force, after which its movable components are welded together to positively and permanently set the fastener. Each bracket extends behind the chassis to support a rotational coupling device including a pin rotatable about a transverse axis. Opposite arms of the tag axle frame support clevis type coupling features at their forward ends. Each clevis type feature is integrally coupled to one of the pins. An actuator used to pivot the tag axle frame can be coupled to the chassis and frame through similar rotational coupling devices and clevis type features.

23 Claims, 7 Drawing Sheets

TAG AXLE PIVOT MOUNT

BACKGROUND OF THE INVENTION

The present invention relates to auxiliary axle assemblies for vehicles used to transport heavy loads, and more particularly to systems for mounting and operating the auxiliary axle assemblies.

Auxiliary axles, also known as tag axles, booster axles, and swing-frame axles, traditionally are employed in concrete transit mixers, gravel trucks, refuse hauling trucks and other vehicles used to haul heavy loads. The wheels of the auxiliary axles are mounted to a frame including transversely spaced apart pivot arms. The arms are attached rotatably to opposite longitudinal rails or frame members of the vehicle chassis whereby the frame can pivot relative to the vehicle chassis between a lowered position with the wheels engaging the ground, and a retracted position in which the wheels are supported above the ground. A hydraulic cylinder, coupled between the chassis and the frame, is extensible and retractable to alternatively lower and raise the frame and wheels.

Tag axle assemblies are useful in terms of increasing the actual and legal (weight per axle) load carrying capacity, and can improve balance and stability, mainly by increasing the distance between the most forward and most rearward axles during transit.

The pivotal couplings of tag axle frames with vehicle chassis are subject to severe environmental conditions occasioned by exposure to dirt and grime, shock, vibration and other applied loads during transit and on the job site, and exposure to chemicals such as the acid wash used to clean concrete transit mixers. Accordingly, manufacturers have attempted to provide tag axle systems designed for easier access to pivot joints for maintenance, repair, and replacement. Examples of this approach are shown in U.S. Pat. No. 5,897,123 (Cherney et al.), and U.S. Pat. No. 6,135,469 (Hulstein et al.). In U.S. Pat. No. 7,175,189 (Eull), a booster axle mounting system includes brackets attached to a truck frame, a pair of pivot bearings secured to forward ends of booster axle assembly arms, and a pair of pivot pins, each connecting one of the pivot bearings to one of the brackets. The pivot bearings are welded to the axle frame arms.

U.S. Pat. No. 6,478,317 (Konop) discloses a pair of pivot joint units for coupling an auxiliary axle assembly to the rails of a vehicle chassis. Each unit includes a bracket removably bolted to one of the chassis rails and supporting a bushing and pivot pin. Dual prong connectors are fixed to a forward portion of an auxiliary axle frame, and removably coupled to the pivot pins. This arrangement is said to provide removable and replaceable pivot joints and provide no pivotal wear parts that are permanently attached to the chassis.

Although the foregoing approaches may afford several advantages, they are subject to the risk of improper assembly inherent in systems that contemplate repeated disassembly and reassembly for maintenance, repair, or replacement of components. As an example, the bolts used to secure the brackets to the chassis rails must be tightened to the proper torque or bolt tension to integrally secure the brackets without unduly stressing or otherwise damaging the bolt or nut. Although factory settings involve proper bolt tensioning, there is no assurance that repeated bracket mountings after disassembly for inspection, repair, etc. will entail the same level of care to ensure proper tensioning. Further, because the bracket-supporting bolts are not permanently secured, they may become loose when subject to shock and vibration of components during transit and at the job site.

Therefore, the present invention has several aspects directed to one or more of the following objects:

to provide an auxiliary axle system that is easier to maintain due to a permanent installation of components mounted removably in previous systems;

to provide an auxiliary axle mounting apparatus capable of accommodating different transverse distances between vehicle frame members;

to provide a process for equipping a vehicle chassis to pivotally support an auxiliary axle frame in which longer lasting components are permanently installed to enhance system reliability and useful life; and to provide an auxiliary axle system in which durable bushings are advantageously employed to rotatably couple the auxiliary axle frame to the chassis, and to a cylinder used to controllably raise and lower the frame.

SUMMARY OF THE INVENTION

To achieve these and other objects, there is provided an apparatus for pivotally mounting an auxiliary axle frame to a vehicle chassis. The apparatus includes a first bracket having a plurality of bracket openings formed through a forward region thereof. The first bracket comprises a first coupling device along a rearward region thereof. The first bracket is adapted for placement in a mounting position along a longitudinally extending first frame member of a vehicle chassis with the rearward region extended longitudinally beyond the chassis, and with the bracket openings aligned with a plurality of complementary openings formed through the first frame member. The apparatus includes a second bracket having a plurality of bracket openings formed through a forward region thereof and comprising a second coupling device along a rearward region thereof. Wherein the second bracket is adapted for placement in a mounting position along a longitudinally extending second frame member of the vehicle chassis spaced apart transversely from the first frame member, with the rearward region extended longitudinally beyond the chassis and with the bracket openings aligned with a plurality of complementary openings formed through the second frame member. A plurality of fasteners are provided. Each fastener is adapted to extend through one of the bracket openings and its aligned complementary opening when the associated bracket is in the mounting position. Each fastener comprises first and second fastener elements movable relative to one another to adjust a tensile force in the fastener to secure the associated bracket integrally to the associated frame member. A fastener fixing component is associated with each fastener. The fixing component is adapted to permanently join the first and second fastener elements after adjustment of the fastener to secure the associated bracket, whereby the fasteners cooperate to permanently secure the brackets in their respective mounting positions. The first and second coupling devices are adapted to releasably engage first and second complementary coupling features mounted to a forward end region of an auxiliary axle frame. The coupling devices and coupling features, when so engaged, cooperate to couple the auxiliary axle frame for pivoting relative to the chassis about a transverse pivot axis.

A salient feature of the invention is that the first and second brackets are secured to their respective frame members permanently, in the sense that the brackets are removable from the frame members only by use of a cutting tool or other approach destructive to the fasteners. In preferred versions, each fastener includes an externally threaded bolt and an internally threaded nut. The bracket is permanently fixed by welding each nut to its associated bolt after tightening to the desired torque. In this manner, each of the nut and bolt assemblies is fixed at the desired torque and bolt tension.

Thus, regardless of any shock and vibration experienced by the frame members and their attached brackets, each bracket remains positively secured, and each of the fasteners remains at the desired level of tension.

Given the permanence of the bracket attachment, it is important to provide durable and long-lasting coupling devices. To this end, a preferred coupling device comprises a bushing described in U.S. Pat. No. 4,840,395 (Sturmon), and available from Atro Engineered Systems, Inc. of Sullivan, Mo. The bushing includes an elongate steel pin, a polyurethane sleeve surrounding the pin and rotatably supporting the pin, and a steel outer sleeve surrounding and fixed to the polyurethane sleeve. This bushing has been found to withstand challenging environmental conditions, and is expected to last for the life of the vehicle. This removes the need for periodic maintenance, repair, and replacement of the bushing, to enable a permanent mounting of the brackets.

The preferred bracket has a longitudinally extending plate and a cylindrical housing that extends in a plate thickness direction. If desired, the bracket can incorporate gussets joined to the plate and housing. In either case, the housing supports the bushing to align the pin in the thickness direction.

In one highly preferred version, an exterior surface of the pin and an interior surface of the polymeric sleeve are shaped to provide confronting circumferential grooves and ribs in an alternating arrangement that prevents the pin from sliding axially, i.e. transversely, relative to the sleeve.

Preferably, each of the complementary coupling features comprises a clevis arrangement with first and second clevis sections removably coupled to opposite ends of the associated pins. The clevis sections can be slotted in the axial or transverse direction, to accommodate connection to the coupling devices over a range of different transverse spacings between chassis frame members.

Another aspect of the invention is a process for equipping a vehicle chassis to pivotally support an auxiliary axle frame, including:

(a) providing first and second elongate chassis reinforcing and pivot support brackets having respective first and second rearward end regions comprising respective first and second pivotal coupling devices adapted for removable coupling to first and second complementary coupling devices mounted to an auxiliary axle frame to pivotally couple the auxiliary axle frame to the chassis;

(b) using a plurality of fasteners to secure the first bracket integrally to a first longitudinal frame member of a vehicle chassis and to secure the second bracket integrally to a second longitudinal frame member of the chassis spaced transversely apart from the first frame member, such that the respective first and second rearward end regions of the brackets extend longitudinally beyond the chassis, wherein each of the fasteners comprises first and second fastener elements movable relative to one another to adjust a tensile force along the fastener when so securing the associated bracket; and (c) after so securing the first and second brackets, permanently attaching the first and second fastener elements of each fastener to one another, whereby the fasteners cooperate to permanently and integrally secure the first and second brackets to the chassis.

Preferably, the fasteners securing each of the brackets are adjusted to a predetermined tensile force level before the fastener elements are permanently attached. According to one version of the process, the fasteners are nuts and bolts, and the predetermined tensile force level is reached by tightening the nuts and bolts to a predetermined torque. After tightening, the nut and bolt are welded together to complete the permanent attachment.

Another aspect of the invention is an auxiliary axle system for a vehicle. The system includes a first bracket mounted permanently and integrally to a first longitudinally extending frame member of a vehicle chassis. The first bracket comprises a forward region contiguous with the first frame member and a rearward region extended longitudinally away from the chassis. A second bracket is mounted permanently and integrally to a second longitudinally extending frame member of a vehicle chassis. The second bracket comprises a forward region contiguous with the second frame member and a rearward region extended longitudinally away from the chassis in transversely spaced apart relation to the rearward region of the first bracket. The rearward regions of the first and second brackets respectively comprise first and second coupling components. The system further includes an auxiliary axle frame. Third and fourth coupling components are disposed along a forward end region of the auxiliary axle frame and are rotatably engaged with the first and second coupling components respectively, to support the auxiliary axle frame for pivoting relative to the chassis about a transverse pivot axis.

Each bracket can be attached to its associated frame member with a plurality of threaded fasteners, each fastener extending through a pair of aligned openings, one through the bracket and the other through the frame member. Each fastener is selectively tightened to produce a predetermined tensile force for holding the bracket and frame member together.

The auxiliary axle system further can include a lever arm fixed with respect to the auxiliary axle frame, and a double acting cylinder coupled at opposite ends to the lever arm and the chassis. A fifth coupling component joins one end of the cylinder to the lever arm. The first, second and fifth coupling components can comprise first, second, and third rotational coupling devices, each device adapted for rotation about a transverse axis. Each of the coupling devices comprises an elongate pin and a polymeric sleeve surrounding and rotatably supporting the pin. Preferably the pin and sleeve are selectively shaped along their interface to prevent any substantial transverse movement of the pin relative to the sleeve.

In preferred arrangements the first and second coupling components comprise rotational coupling devices and the third and fourth coupling components comprise clevis-type coupling features. In an alternative arrangement the first and second coupling components comprise clevis-type coupling features and the third and fourth components comprise rotational coupling devices.

Thus in accordance with the present invention, concrete transit mixers and other vehicles designed to carry heavy loads can be equipped to support a tag axle system, with brackets permanently attached to longitudinal frame members of the chassis. The brackets reinforce the associated frame members, and extend longitudinally beyond the chassis to support pivotal coupling devices that are joined to complementary coupling features of the auxiliary axle frame. The pivotal coupling devices incorporate durable bushings designed to last the life of the vehicle. This eliminates the need for periodic disassembly of the pivot mounting components, reducing overall maintenance costs and more effectively ensuring that components of the pivot mounting system are maintained at desired factory settings.

IN THE DRAWINGS

For a further understanding of the foregoing features and other advantages, reference is made to the following detailed description and to the drawings, in which.

DETAILED DESCRIPTION OF THE PREFERRED EMBODIMENTS

Figure 1:
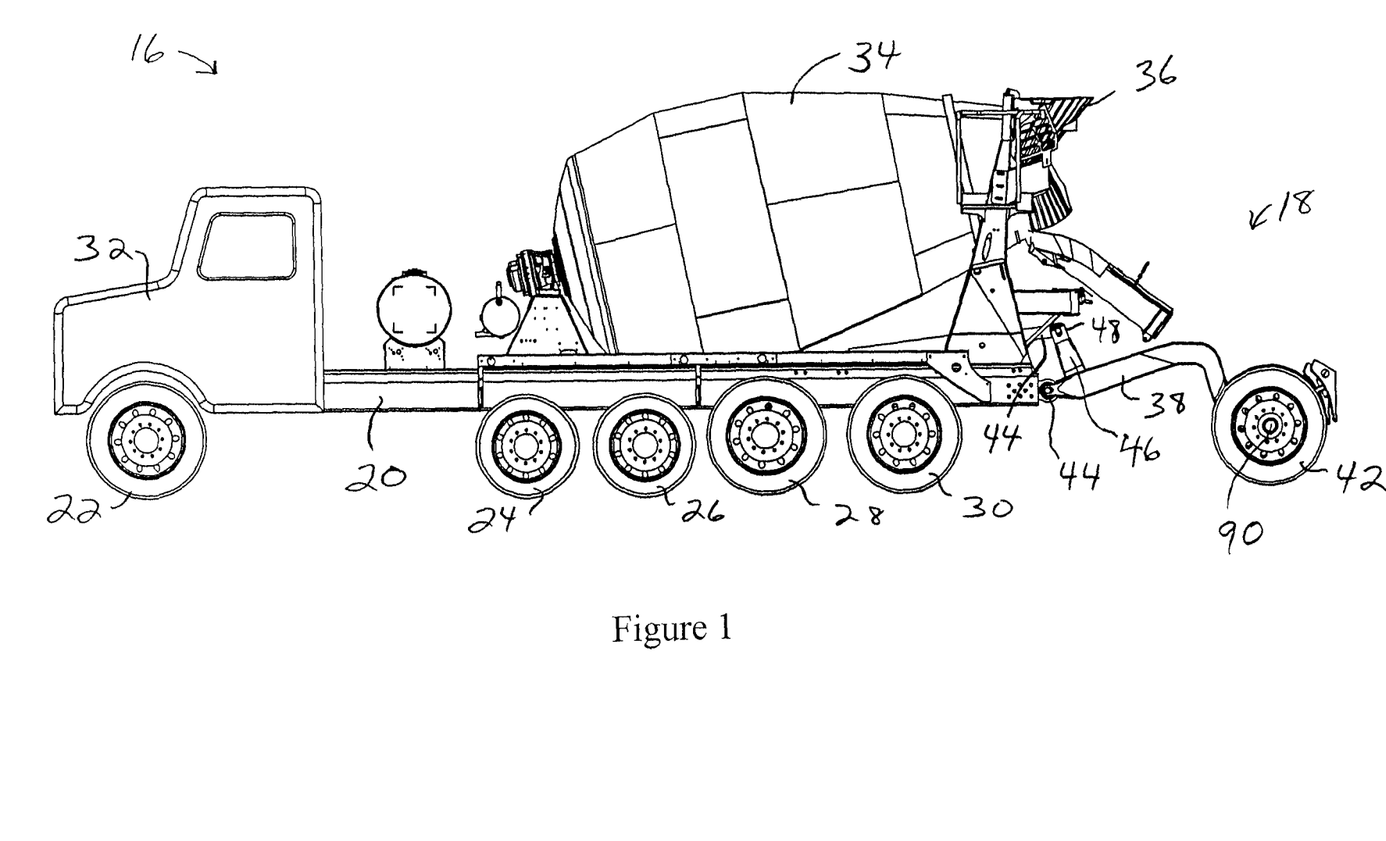
FIG. 1 is a side elevation of a transit concrete mixer equipped with a tag axle system in accordance with the present invention.

Turning now to the drawings, there's shown in FIG. 1 a transit concrete mixer or vehicle 16 equipped with an auxiliary axle system 18.

Vehicle 16 includes a main frame of chassis 20 supported by several wheel/axle assemblies including a forward assembly 22 for steering, and additional load bearing assemblies 24, 26, 28, and 30. Components supported by the chassis include a cab 32, a mixing drum 34 supported to rotate relative to the chassis, and a hopper 36 located behind an upper opening of the drum to facilitate loading materials into the drum.

Auxiliary axle system 18 includes a tag axle frame 38 secured to chassis 20 through a rotational coupling 40. Thus, the tag axle frame is mounted to pivot relative to the chassis between an operating position for transit in which a pair of tag wheels 42 engage the ground, and a stowage position in which frame 38 is generally upright and supports wheels 42 near hopper 36.

The location of frame 38 is controlled by a hydraulic actuator 44 joined to a torque arm 46 through a rearward rotational coupling 48 and joined at its forward end to chassis 20. The torque arm is integral with the tag axle frame. As a result, the actuator is retractable and extensible to respectively raise and lower the tag axle system.

Figure 2:
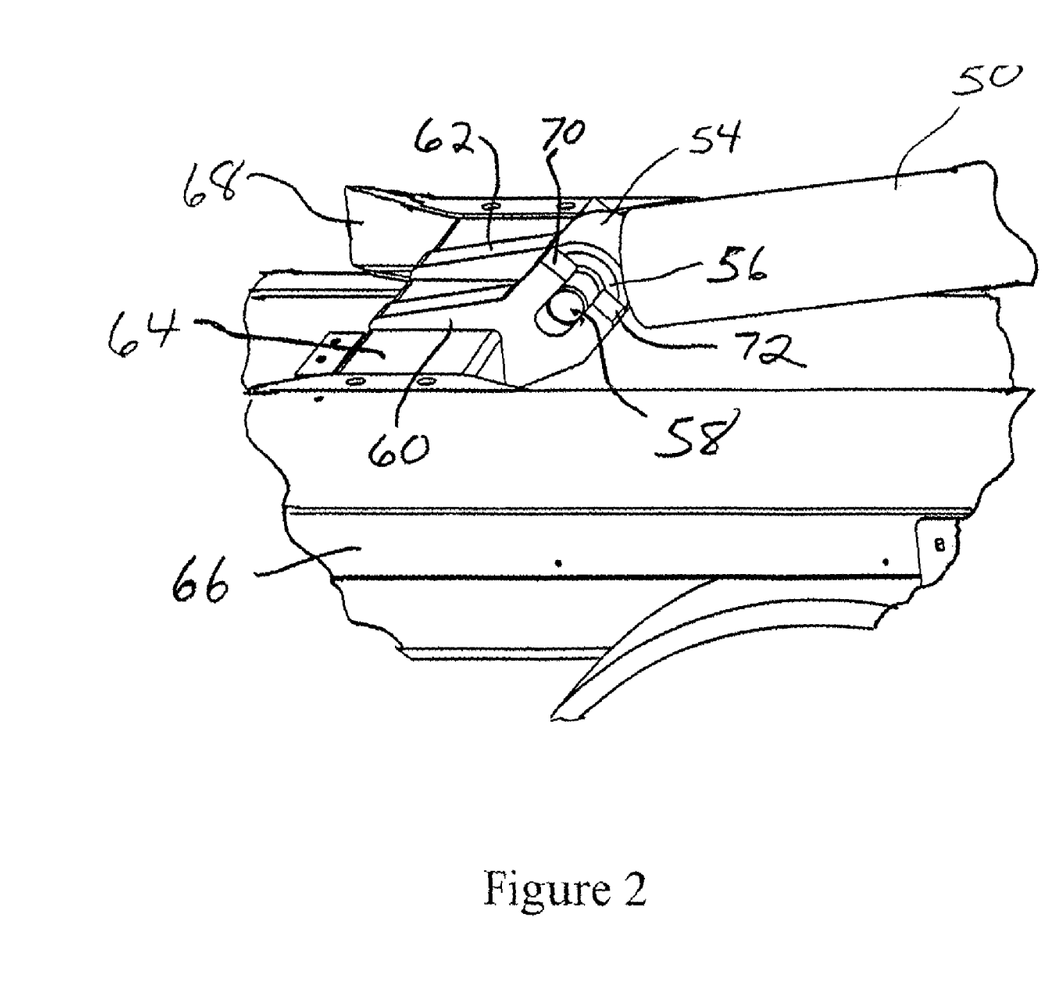
FIG. 2 is an enlarged perspective view showing a frontal end coupling of an actuator that operates the tag axle system.
Figure 3:
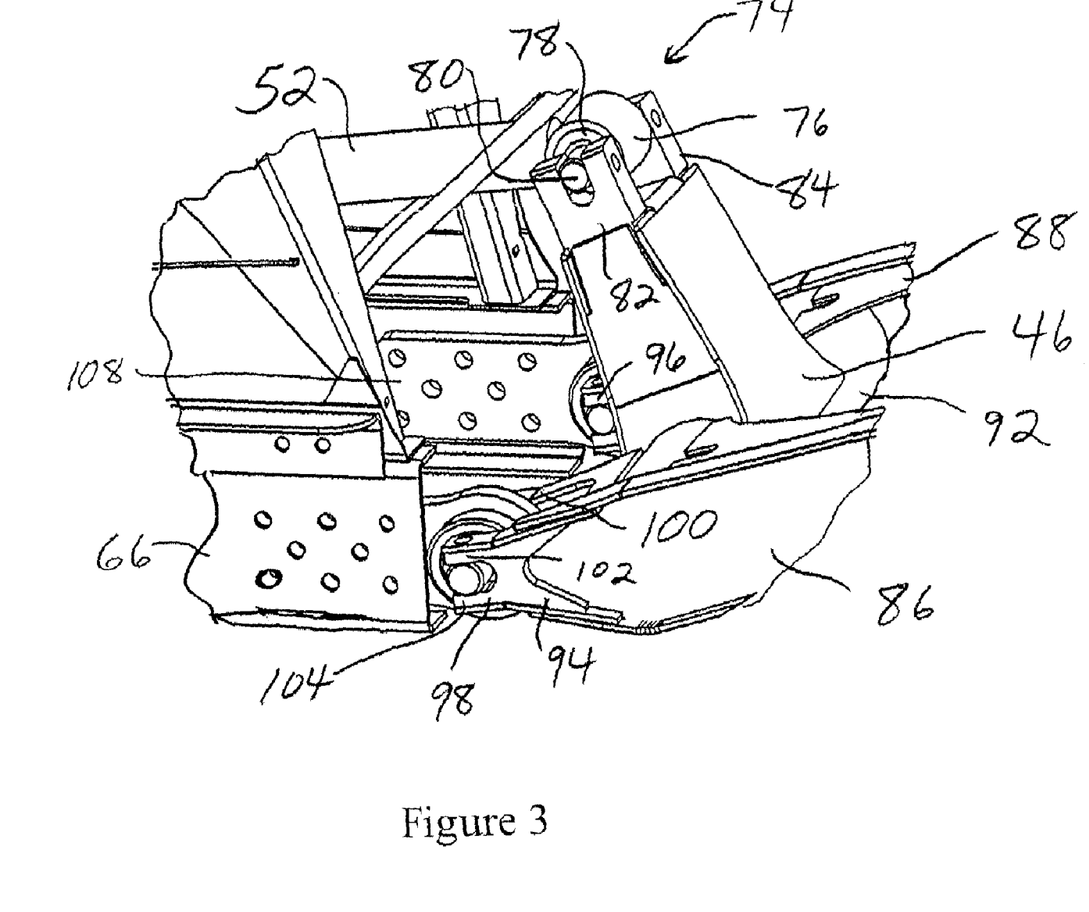
FIG. 3 is an enlarged perspective view showing a rearward coupling of the actuator and a pivotal coupling of the tag axle system.

The rotational couplings that secure actuator 44 are shown in more detail in FIGS. 2 and 3. The actuator includes a hydraulic cylinder 50 and a rod 52 mounted to reciprocate relative to the cylinder. With reference to FIG. 2, cylinder 50 is coupled to chassis 20 through a forward rotational coupling device that includes a cylindrical housing 54 integral with the cylinder, a sleeve 56 integral with and surrounded by the housing, and an elongate pin 58 surrounded by and rotatable relative to the sleeve and housing. A clevis type coupler is fixed to chassis 20 for joiner to the coupling device, specifically to opposite ends of pin 58 that extend beyond the housing and sleeve. The coupler includes a pair of clevis fixtures 60 and 62 fixed to a cross frame member 64 extending transversely between a pair of spaced apart elongate longitudinal frame members or rails 66 and 68 of the chassis. Clevis fixture 60 includes opposed extensions 70 and 72 on opposite sides of pin 58. The fixture is secured to the pin by a bolt that extends through openings in the extensions and the pin. Clevis fixture 62 is similarly configured and similarly coupled to the opposite end of pin 58. As a result, rotation of the sleeve and housing relative to pin 58 allows actuator 44 to pivot relative to the chassis.

With reference to FIG. 3, a coupling device 74 of rearward coupling 48 includes a cylindrical housing 76 integral with rod 52, a sleeve 78 fixed relative to the housing, and a pin 80 rotatable within sleeve 78. The pin is fixed with respect to torque arm 46 through a clevis-type coupler including torque arm fixtures 82 and 84, each with a pair of extensions on opposite sides of pin 80 and coupled to the pin by a bolt extending through openings in the extensions and pin in the manner previously described. Rotation of pin 80 within sleeve 78 allows rod 52 to pivot relative to the torque arm and tag axle frame.

Tag axle frame 38 includes a pair of spaced apart tag axle arms 86 and 88 forming opposite sides of the frame. At a rear portion of the frame, a tag axle 90 (FIG. 1) extends transversely from one of the tag axle arms to the other, and rotatably supports tag wheels 42. A torque tube 92 extends transversely between arms 86 and 88 near a forward portion of the frame. Torque arm 46 extends upwardly from a central region of the torque tube.

Two clevis-type coupling features 94 and 96 are secured to tag axle frame 38, one at the forward end of each of tag axle arms 86 and 88. Coupling feature 94 includes two transversely spaced apart clevis fixtures 98 and 100. Each of the fixtures has a pair of spaced apart forwardly directed extensions, as indicated at 102 and 104 with respect to clevis fixture 98. Coupling feature 96 is substantially identical to coupling feature 94.

Along with coupling features 94 and 96, the arrangement for mounting tag axle frame 38 pivotally to chassis 20 includes a pair of brackets 106 and 108, and rotational coupling devices 110 and 112 mounted respectively to brackets 106 and 108.

Figure 4:
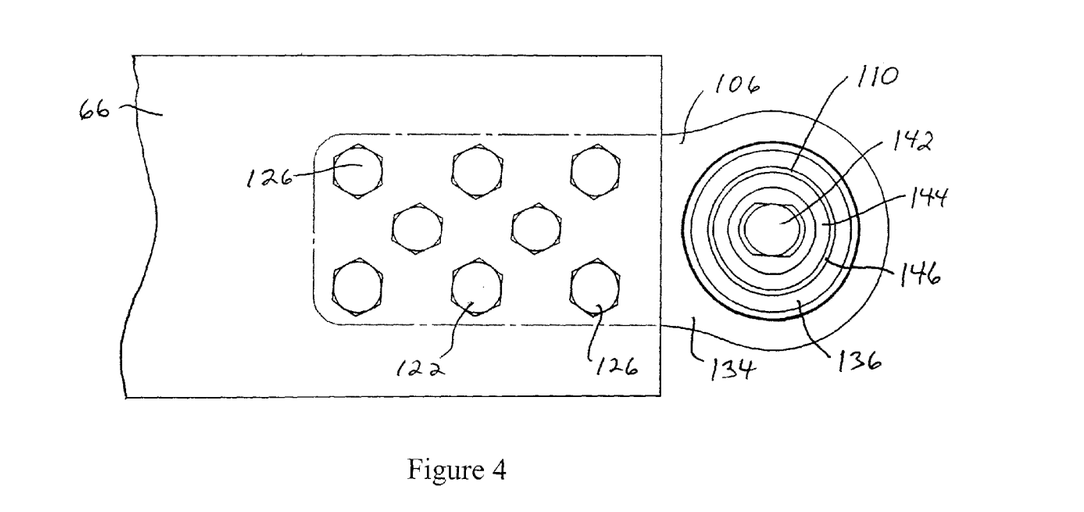
FIG. 4 is a side elevation showing the permanent coupling of a support bracket to the chassis of the transit concrete mixer, as viewed from outside the chassis.

The mounting arrangement is well suited for attaching a tag axle frame to a vehicle not previously equipped to support such frame. As seen in FIGS. 3 and 4, bracket 106 is disposed along a rearward end region of rail 66. A portion of the bracket that supports coupling device 110 extends rearwardly beyond the chassis. The remainder of the bracket is contiguous with the rail. Similarly, bracket 108 is contiguous with a rearward end region of an opposite rail 68, and extends rearwardly to position coupling device 112 beyond the chassis. A series of bracket openings 118 are formed through bracket 108 in the thickness direction of the bracket. Similar bracket openings are formed through bracket 106. A series of rail openings 120 are formed through rail 66 in a pattern to match the arrangement of bracket openings. In the same fashion, rail openings are formed through rail 68.

Each of brackets 106 and 108 is secured to its associated rail by positioning the bracket against the rail with the bracket openings and rail openings aligned. Then, a series of threaded fasteners 122, each extending through an aligned pair of the rail and bracket openings, are tightened to secure the bracket.

Figure 5:
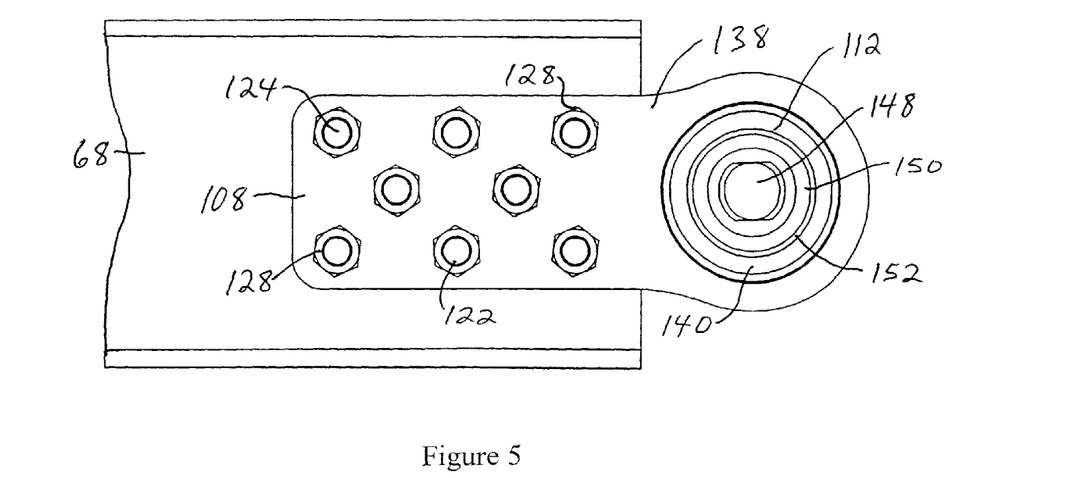
FIG. 5 is a side elevation showing the coupling of a support bracket to the chassis as viewed from a location between opposite side rails of the chassis.
Figure 6:
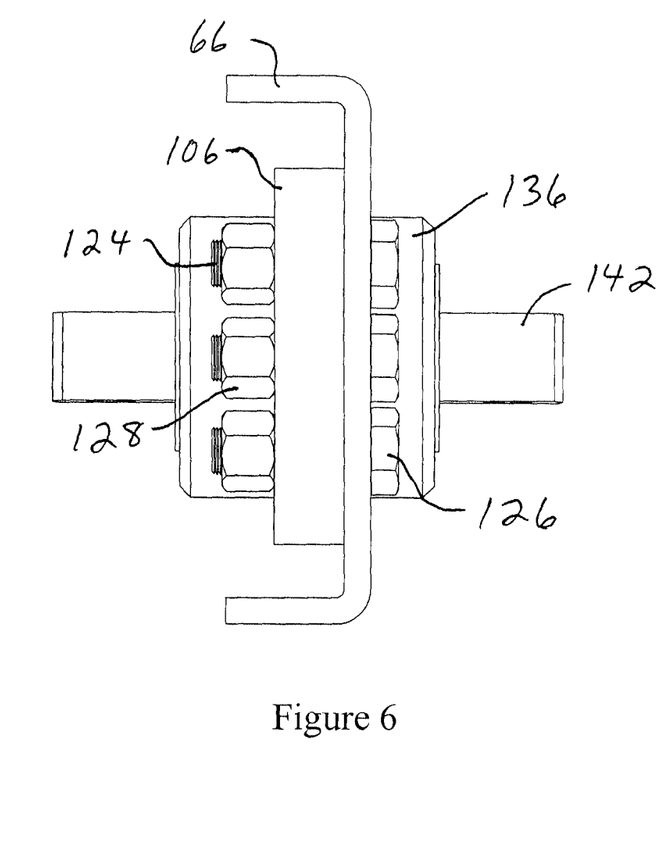
FIG. 6 is a rearward end view showing the coupling of a bracket to the chassis.

The result is shown in FIGS. 4-6. FIG. 4 shows bracket 106 mounted to rail 66. The bracket is disposed inside the rail, i.e. behind the rail as viewed in the Figure. The pattern of fasteners 122 replicates the patterns of the bracket openings and rail openings.

FIG. 5 shows the mounting of bracket 108 to rail 68. Again the bracket is disposed inside of the rail, but is shown in front of the rail to show the opposite sides of fasteners 122. As best seen in FIG. 6, each of fasteners 122 includes an elongate externally threaded bolt 124 having a hexagonal head 126, and an internally threaded nut 128. Each fastener can also include a washer between the head and rail, and a washer between the nut and bracket.

Bracket 106 has a substantially planar plate 134, and a cylindrical housing 136 that extends axially in the thickness direction of the plate. Similarly, bracket 108 includes a plate 138 and a cylindrical housing 140 extending in the thickness direction. Rotational coupling device 110 includes an elongate pin 142 extended in the thickness direction, an inner sleeve 144 surrounding and rotatably supporting the pin, and an outer sleeve 146 surrounding the inner sleeve and bonded to the inner sleeve. The coupling device, including the pin and sleeves, is press fit into housing 136. In like fashion, coupling device 112 including a pin 148, inner sleeve 150, and an outer sleeve 152 is press fit into housing 140.

Figure 7:
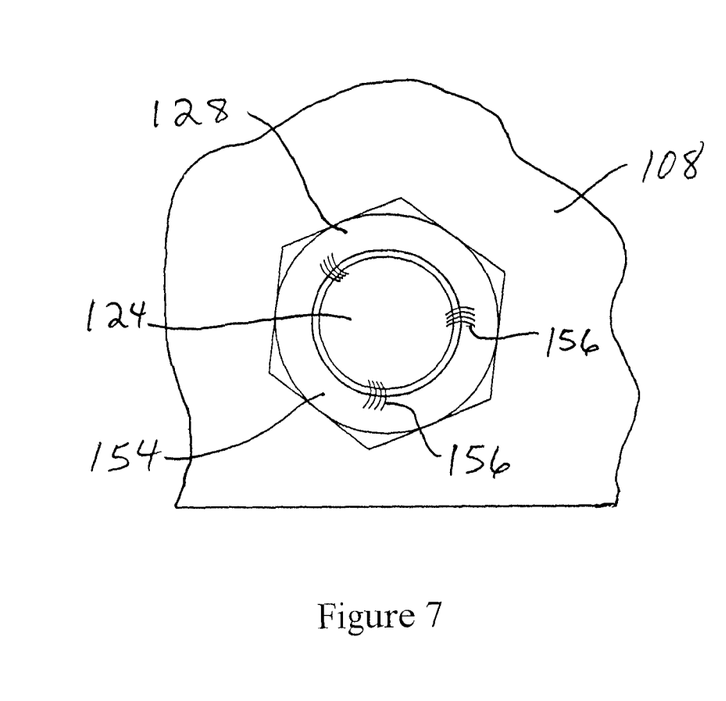
FIG. 7 is an enlarged partial view of FIG. 5 showing one of the fasteners used to secure the bracket to the chassis.

The brackets are secured to their respective rails by tightening each of the fasteners 122 to a predetermined level of tensile force along the length of each bolt 124. To this end, each nut 128 is tightened to a predetermined torque designed to create the desired bolt tension. A salient feature of present invention is that the brackets are secured to the rails permanently, in the sense that removal of the brackets would require an approach destructive to the fasteners, such as cutting. In this regard, the preferred approach is to weld each nut to its associated bolt after the nut has been tightened to the predetermined torque. In the preferred approach, several localized welds are formed circumferentially about each bolt 124, at the interface of the bolt and an outer surface 154 of the nut. For example, FIG. 7 illustrates three localized welds 156, spaced apart angularly about 120 degrees from one another. The combined circumferential length of the welds can range from 45 to 90 degrees. Although the welds are sufficient to permanently fuse the nut and bolt, their localized nature minimizes the degree to which the nut and bolt must be heated to effect the weld, thus minimizing any negative impact on the structural integrity of the fastener, particularly the bolt.

As an alternative to welding nut 128 and bolt 124, an adhesive could be applied to fix these components.

In any event, it is advantageous to permanently secure the fasteners for several reasons. First, permanent mounting ensures that the fasteners remain set at the prescribed levels of torque and tensile force. In mounting systems that contemplate periodic removal of the brackets for inspection, maintenance, repair, or replacement of the rotational couplings, reassembly involves the risk that some or all of the fasteners may not be tightened to the correct torque. This can lead to inadequate support of the tag axle system, damage to the fasteners, or both. Also, the fasteners that are not permanently secured are subject to working loose over time as the tag axle mounting system is subjected to repeated shock and vibration during transit and use. Permanently secured fasteners overcome these problems, and further ensure that the brackets remain properly positioned for the life of the vehicle.

Figure 8:
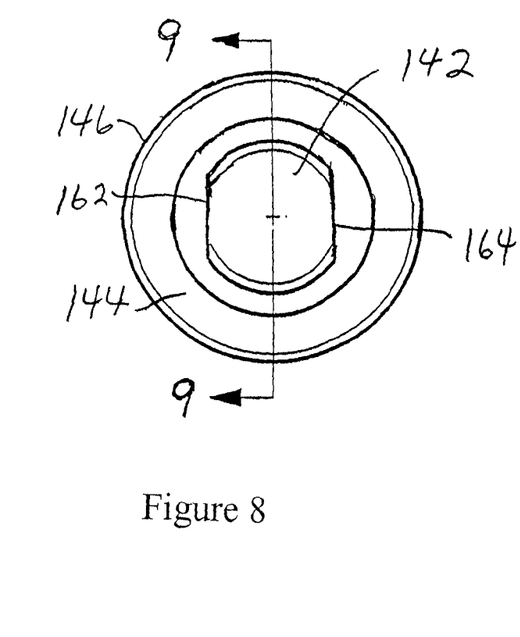
FIG. 8 is an end view of one of the rotational coupling devices used to couple the tag axle frame to the chassis.
Figure 9:
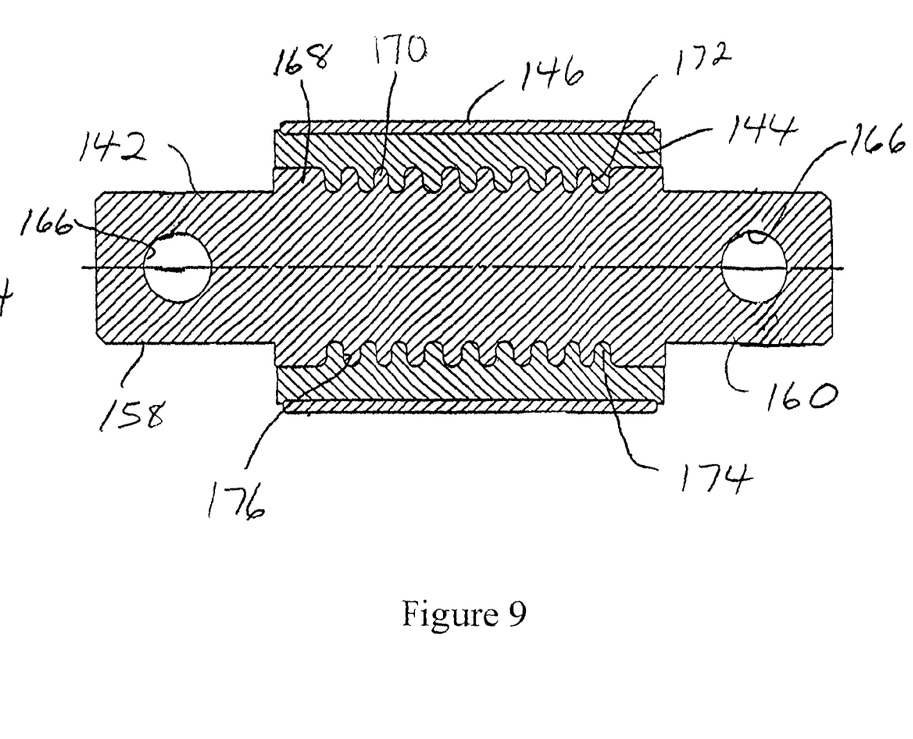
FIG. 9 is a sectional view taken along the line of 9-9 in FIG. 8.

Permanently fixed fasteners increase the difficulty of removing the brackets from their respective rails. As noted above, disassembly requires an approach that is destructive to the fasteners. In accordance with the present invention, this issue is addressed by providing a rotational coupling that is durable and expected to perform reliably for the life of the vehicle, without the need to disassemble the coupling for maintenance or repair. As seen in FIGS. 8 and 9, rotational coupling device 110 includes elongate pin 142, inner sleeve 144 surrounding the pin, and outer sleeve 146 surrounding the inner sleeve. The pin includes opposite end regions 158 and 160, along which opposite planer surfaces 162 and 164 are formed. A transverse opening 166 is formed through each of the end regions about an axis perpendicular to the planar surfaces. A medial region 168 of the pin has a maximum diameter larger than the diameter of the end regions. A series of alternating circumferential rounded ribs 170 and grooves 172 are formed along medial region 168 along the interface with inner sleeve 146. Along its inside surface, the inner sleeve is formed with a complementary series of circumferential ribs 174 and grooves 176, arranged with respect to pin 142 such that the ribs of each component extend radially into the grooves of the other component. The ribs and grooves are sized to provide a close fit that allows pin 142 to rotate freely while preventing any substantial axial pin movement relative to sleeve 144.

Outer sleeve 146 is bonded to inner sleeve 144 along their interface, and occupies a circumferential groove formed in the inner sleeve to further ensure an integral attachment of the sleeves.

Pin 142 and outer sleeve 146 preferably are formed of steel. Inner sleeve 144 is formed of a polymer, preferably polyurethane and more preferably a blend of polyurethane selected to minimize any tendency of the inner sleeve to become brittle over time. As noted previously, the rotational coupling is available from Atro Engineered Systems, Inc. of Sullivan, Mo. Rotational coupling device 112 is substantially identical in construction.

In an alternative embodiment, rotational couplings 40 and 48 at the opposite ends of hydraulic actuator 44 incorporate coupling devices substantially identical in construction to rotational coupling devices 110 and 112. In this event, the actuator is attached to chassis 20 and torque arm 46 through couplings expected to last for the life of the vehicle without the need for disassembly to inspect, maintain, or repair them.

Figure 10:
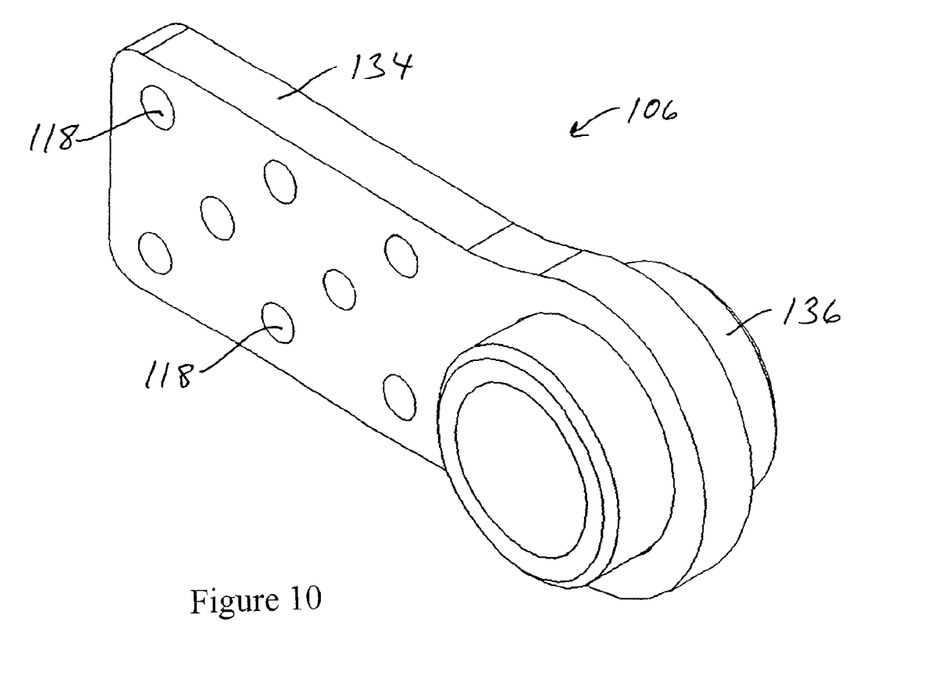
FIG. 10 is a perspective view of one of the support brackets.

FIG. 10 illustrates bracket 106. The bracket preferably is formed of steel, with plate 134 having a substantially uniform thickness in the transverse direction and having an increased width at its rearward end region to accommodate housing 136. The housing is secured in the plate by circumferential welds on both sides of the plate.

Figure 11:
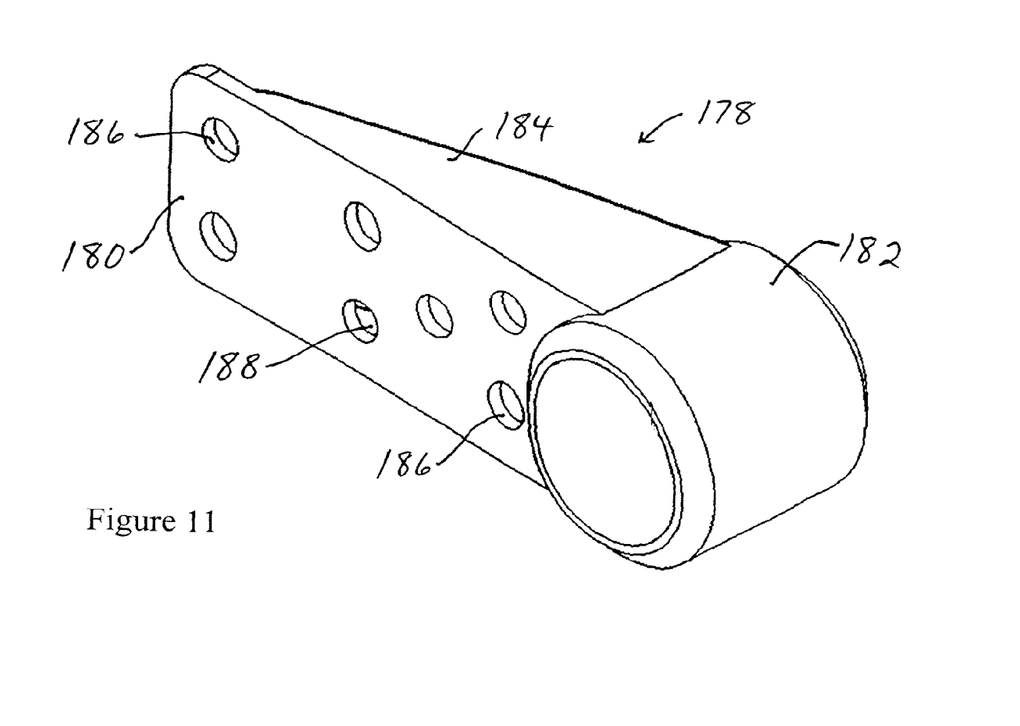
FIG. 11 is a perspective view of an alternative embodiment support bracket.

FIG. 11 shows an alternative embodiment bracket 178, also preferably formed of steel. The bracket includes a plate 180 and a cylindrical housing 182 at the rearward end of the plate. A pair of gussets, one of which is shown at 184, are formed along opposite side edges of the plate and coupled to the housing along their rearward ends. Seven bracket openings 186 are formed through plate 180. Part of the opposite gusset 188 is visible through one of openings 186. In this construction the gussets reinforce the coupling of the plate and housing, and in a more general sense strengthen the entire bracket. As a result, plate 180 as compared to plate 134 can be thinner, and need not surround the housing. Bracket 178 can be formed as a single casting.

In accordance with the invention, a tag axle frame can be mounted pivotally to a chassis of a transit concrete mixer or other vehicle with only slight modification of these components. Initially, rotational coupling devices 110 and 112 are press fit into brackets 106 and 108, or into a pair of brackets similar to bracket 178 if that style is selected. A series of rail openings are drilled through the rearward end regions of the rails in a pattern corresponding to the bracket openings.

At this stage, each of the brackets is positioned against its associated rail with the bracket openings and rail openings aligned. Fasteners are inserted through aligned pairs of the bracket and rail openings. Each nut is tightened onto its associated bolt to a predetermined torque to achieve a predetermined tensile force in the bolt. When each nut is properly tightened, the nut and bolt are welded together along their interface closest to the free end of the bolt. At this stage, the chassis is equipped for pivotal attachment of an auxiliary axle system.

Depending on the design of the auxiliary or tag axle frame, there may be a need to attach clevis-type features. This can be accomplished by welding features similar to coupling features 94 and 96 to the forward ends of the tag axle arms. Each coupling feature is attached to its associated coupling device by aligning its pair of clevis fixtures with the associated pin to align the openings through the pin and extensions. Threaded fasteners are used to secure the clevis fixtures integrally to their associated pin. Preferably the extensions of the clevis fixtures incorporate openings in the form of transversely extending slots, to provide a degree of tolerance for coupling to pins with slightly different spacings between openings. If desired, longer slots can be formed to provide flexibility in accommodating different transverse spacings between chassis rails and the resulting variance in transverse spacing between brackets.

At this stage, a hydraulic actuator on the order of actuator 44 is connected between the chassis and the tag axle frame, specifically the torque arm. Depending on the chassis design, this may require welding a clevis type coupler, e.g. with clevis fixtures similar to fixtures 60 and 62, to a cross member of the chassis. Likewise, attachment of the actuator rod may require welding a clevis type coupler to the torque arm.

Although the foregoing approach is preferred, a pivotal coupling of the chassis and tag axle frame can be accomplished by mounting rotational coupling devices similar to devices 110 and 112 at the forward end regions of the tag axle arms. In this event, the brackets are equipped with clevis-type coupling features, and as before are permanently mounted to their respective rails.

Thus, in accordance with the present invention, a tag axle frame is mounted pivotally relative to a vehicle chassis through coupling devices that are permanently secured to opposite side rails of the chassis. The permanent mounting, and the selection of rotational coupling devices with sufficient durability to last for the life of the vehicle, reduce the cost of maintaining the system, and ensure more reliable operation by maintaining factory placement of the brackets and factory settings of the fasteners that secure the brackets.

What is claimed is:

1. An apparatus for pivotally mounting an auxiliary axle frame to a vehicle chassis, including:
    a first bracket having a plurality of bracket openings formed through a forward region thereof and comprising a first coupling device along a rearward region thereof, wherein the first bracket is adapted for placement in a mounting position along a longitudinally extending first frame member of a vehicle chassis with the rearward region extended longitudinally beyond the chassis, and with the bracket openings aligned with a plurality of complementary openings formed through the first frame member;
    a second bracket having a plurality of bracket openings formed through a forward region thereof and comprising a second coupling device along a rearward region thereof, wherein the second bracket is adapted for placement in a mounting position along a longitudinally extending second frame member of the vehicle chassis spaced apart transversely from the first frame member, with the rearward region extended longitudinally beyond the chassis and with the bracket openings aligned with a plurality of complementary openings formed through the second frame member;
    a plurality of fasteners, each fastener adapted to extend through one of the bracket openings of an associated one of the brackets and its aligned complementary opening when the associated bracket is in the mounting position, each fastener comprising first and second fastener elements moveable relative to one another to adjust a tensile force in the fastener to secure the associated bracket integrally to the associated frame member; and
    a fastener fixing component associated with each fastener adapted to permanently join the first and second fastener elements after adjustment of the fastener to secure the associated bracket, whereby the fasteners cooperate to permanently secure the brackets in their respective mounting positions;
    wherein each of the first and second brackets comprises a longitudinally extending plate and a cylindrical housing extending in a thickness direction of the plate; and each of the first and second coupling devices comprises an elongate pin extending in said thickness direction and surrounded by the housing, and a polymeric sleeve fixed relative to the housing, surrounding the pin and supporting the pin rotatably relative to the plate and housing;
    wherein the sleeve and pin are shaped along an interface thereof to provide circumferential ribs and grooves, interweaved to substantially prevent axial movement of the sleeve and pin relative to one another; and
    wherein the first and second coupling devices are adapted to releasably engage first and second complementary coupling features mounted to a forward end region of an auxiliary axle frame, whereby the coupling devices and coupling features when so engaged cooperate to couple the auxiliary axle frame for pivoting relative to the chassis about a transverse pivot axis.

2. The apparatus of claim 1 wherein:
   each of the brackets further comprises a gusset joined to the plate and to the cylindrical housing.

3. The apparatus of claim 1 wherein:
   each of the fasteners is adjusted to a predetermined tensile force level.

4. The apparatus of claim 1 wherein:
   the fasteners comprise threaded fasteners.

5. The apparatus of claim 4 wherein:
   the fastener elements of each threaded fastener comprise an externally threaded bolt and an internally threaded nut, and the fastener fixing component comprises a weld joining the nut and bolt.

6. The apparatus of claim 1 wherein:
   each of the complementary coupling features comprises a clevis arrangement having first and second clevis sections adapted for removable coupling to opposite end regions of the associated pin.

7. The apparatus of claim 6 wherein:
   each of the clevis sections is slotted to accommodate a range of transverse spacings between the first and second brackets.

8. A process for equipping a vehicle chassis to pivotally support an auxiliary axle frame, including:
    providing first and second elongate chassis reinforcing and pivot support brackets having respective first and second rearward end regions comprising respective first and second pivotal coupling devices adapted for removable coupling to first and second complementary coupling devices mounted to an auxiliary axle frame to pivotally couple the auxiliary axle frame to the chassis;
    using a plurality of fasteners to secure the first bracket integrally to a first longitudinal frame member of a vehicle chassis and to secure the second bracket integrally to a second longitudinal frame member of the chassis spaced transversely apart from the first frame member, such that the respective first and second rearward end regions of the brackets extend longitudinally beyond the chassis, wherein said using the fasteners comprises selectively moving first and second fastener elements of each fastener relative to one another to adjust a tensile force along the fastener to secure an associated one of the brackets; and after so securing the first and second brackets, permanently attaching the first and second fastener elements of each fastener to one another, whereby the fasteners cooperate to permanently and integrally secure the first and second brackets to the chassis;

wherein providing the first and second brackets comprises permanently installing a bushing at the rearward end region of each of the brackets, the bushing comprising a polymeric sleeve fixed with respect to the housing and an elongate pin surrounded by and rotatable with respect to the sleeve, and wherein an interior surface of the sleeve and an exterior surface of the pin are shaped to provide circumferential ribs and grooves along an interface of the sleeve and pin to substantially prevent axial travel of the pin relative to the sleeve.

9. The process of claim 8 wherein:
using the fasteners comprises adjusting each of the fasteners to a predetermined tensile force level.

10. The process of claim 9 wherein:
the movable elements of each fastener comprise an internally threaded nut and an externally threaded bolt, and adjusting each fastener to a predetermined tension comprises tightening each of the bolts to a predetermined torque.

11. The process of claim 8 wherein:
using the fasteners comprises directing each fastener through one of a plurality of bracket openings formed through each of the first and second brackets along a forward end region thereof, and through one of a plurality of complementary openings formed through each of the first and second frame members.

12. The process of claim 8 wherein:
permanently and integrally attaching the first and second fastener elements together comprises welding said elements together.

13. The process of claim 8 further including:
after permanently securing the first and second brackets to the chassis, pivotally attaching an auxiliary axle frame to the chassis by releasably coupling the first and second coupling devices respectively to first and second complementary coupling features located along a forward portion of the auxiliary axle frame.

14. An auxiliary axle system for a vehicle, including:
a first bracket and a first bracket mounting component securing the first bracket integrally to a first longitudinally extending frame member of a vehicle chassis, the first bracket comprising a forward region contiguous with the first frame member and a rearward region extended longitudinally away from the chassis;
a second bracket, and a second bracket mounting component securing the second bracket integrally to a second longitudinally extending frame member of the vehicle chassis, the second bracket including a forward region contiguous with the second frame member and a rearward region extended longitudinally away from the chassis in transversely spaced apart relation to the rearward region of the first bracket, wherein the rearward regions of the first and second brackets respectively comprise first and second coupling components;

wherein the first and second bracket mounting components secure their associated brackets and frame members permanently so as to allow removal of each bracket from its associated frame member only by an approach destructive to the associated bracket mounting component;

an auxiliary axle frame; and third and fourth coupling components disposed along a forward end region of the auxiliary axle frame and rotatably engaged with the first and second coupling components respectively, to support the auxiliary axle frame for pivoting relative to the chassis about a transverse pivot axis;

wherein each of the brackets coin rises a longitudinally extending plate and a cylindrical housing extended in a thickness direction of the plate; and wherein the first and second coupling components comprise first and second rotational coupling devices fixed within the first and second housings, respectively, and each of the rotational coupling devices comprises a polymeric sleeve fixed within the associated housing and an elongate pin rotatably mounted within the polymeric sleeve, and an interior surface of the sleeve and an exterior surface of the pin are shaped to provide circumferential ribs and grooves along an interface of the sleeve and pin to substantially prevent axial travel of the pin relative to the sleeve.

15. The system of claim 14 wherein:
the first and second bracket mounting components comprise respective first and second pluralities of threaded fasteners for mounting the first and second brackets permanently to the first and second frame members.

16. The system of claim 15 wherein:
each of the threaded fasteners is tightened to a predetermined tensile force level for mounting its associated bracket, and further is permanently fixed at said level.

17. The system of claim 14 wherein:
each bracket further comprises a gusset joined to the plate and to the housing.

18. The system of claim 14 further including:
a lever arm fixed with respect to the auxiliary axle frame, and a double acting cylinder coupled at first and second opposite ends thereof with respect to the lever arm and the chassis, retractable and extendable to alternatively raise and lower the auxiliary axle frame.

19. The system of claim 18 further including:
a third rotational coupling device for rotatably coupling the first end of the cylinder and the lever arm, wherein the third rotational coupling device includes a polymeric sleeve coupled to the cylinder and an elongate pin coupled with respect to the lever arm and rotatably contained within the sleeve.

20. The system of claim 14 wherein:
each of the third and fourth coupling components comprises a complementary coupling feature with a clevis arrangement having first and second clevis sections adapted for removable coupling to opposite end regions of the associated pin.

21. The system of claim 14 further including:
a lever arm fixed with respect to the auxiliary axle frame, and a double acting cylinder coupled at first and second opposite ends thereof with respect to the lever arm and chassis, retractable and extendable to alternatively raise and lower the auxiliary axle frame, and a fifth coupling component for coupling the cylinder to pivot relative to the lever arm;

wherein the first coupling component, the second coupling component, and the fifth coupling component respectively comprise first, second, and third rotational coupling devices, each adapted for rotation about a transverse axis.

22. The system of claim 21 wherein:
each of the first, second, and third rotational coupling devices comprises an elongate pin and a polymeric sleeve surrounding the pin and supporting the pin for rotation relative to the sleeve; and
the pin and sleeve are selectively shaped along an interface thereof to prevent any substantial transverse movement of the pin relative to the sleeve.

23. The system of claim 14 wherein:
the first and second coupling components comprise first and second rotational coupling devices, and the third and fourth coupling components comprise first and second clevis-type complementary coupling features.

* * * * *